United States Patent [19]

Grover et al.

[11] 4,262,527
[45] Apr. 21, 1981

[54] SELF-ADJUSTING ENGINE TIMING PICKUP PROBE

[75] Inventors: Donald D. Grover, Kenosha, Wis.; Jerome A. Thompson, Milford, Mich.

[73] Assignee: Snap-On Tools Corporation, Kenosha, Wis.

[21] Appl. No.: 84,738

[22] Filed: Oct. 15, 1979

[51] Int. Cl.³ .......................................... G01M 15/00
[52] U.S. Cl. ..................................... 73/116; 324/392
[58] Field of Search ............. 73/116, 117.3; 324/391, 324/392, 239, 243, 174, 179; 123/146.5 A

[56] References Cited

U.S. PATENT DOCUMENTS

| | | | |
|---|---|---|---|
| 3,832,635 | 8/1974 | Cass | 324/174 X |
| 4,089,316 | 5/1978 | Padgitt | 324/391 X |

FOREIGN PATENT DOCUMENTS 2302500  2/1975  France ...................... 324/391

*Primary Examiner*—Jerry W. Myracle
*Attorney, Agent, or Firm*—Vogel, Dithmar, Stotland, Stratman & Levy

[57] ABSTRACT

A self-adjusting engine timing pickup probe adapted to be received in a tubular engine mounting bracket, the probe extending into close proximity with a position indicator on a rotating engine part to provide an air gap. An elongated sensor assembly extends through the tubular member and has relative axial movement therewith for initial manual adjustment of the sensor assembly to provide an effective air gap. Interference means are provided between the tubular member and the sensor assembly, the interference means establishing substantial resistance to relative axial movement between the tubular member and the sensor assembly. The tubular member has a spring means which engages the engine mounting bracket and holds the two together in a yielding manner. The spring means urges the tubular member and associated sensor assembly inwardly toward the rotating engine part. However, during engine operation, the rotating engine part, due to tolerances, wear, vibrations, etc., engages the sensor assembly and tends to move both the sensor assembly and the tubular member outwardly of the mounting bracket. In so doing, the spring means holding the tubular member in the engine mounting bracket yields, while the interference means between the tubular member and the sensor assembly does not yield. Thus, the engagement between the sensor assembly and the rotating engine part does not cause relative axial movement between the tubular member and the sensor assembly.

6 Claims, 4 Drawing Figures

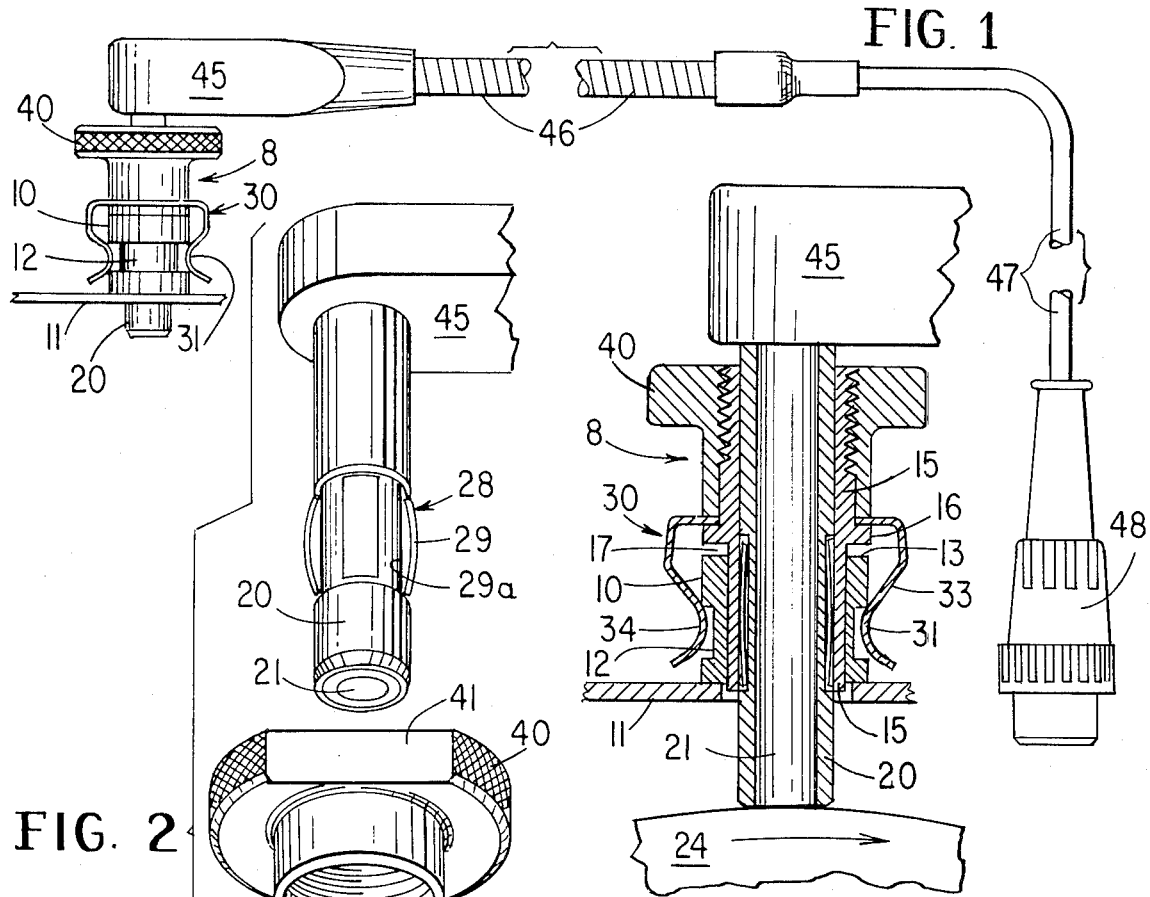
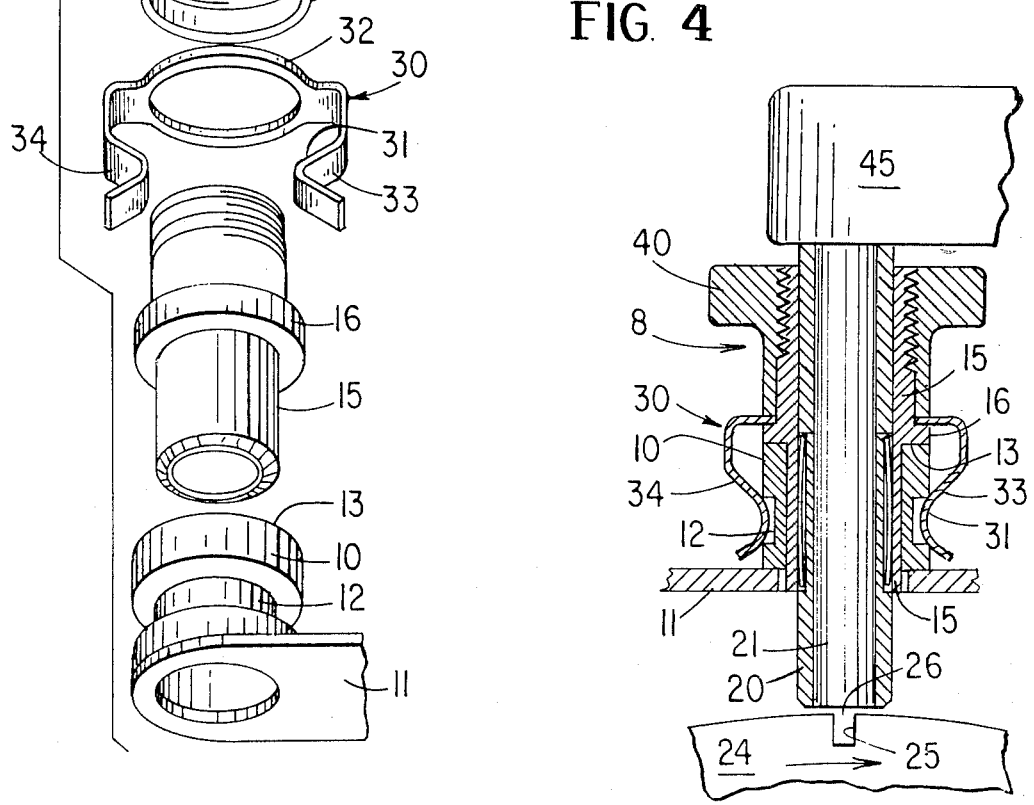

4,262,527

SELF-ADJUSTING ENGINE TIMING PICKUP PROBE

BACKGROUND OF THE INVENTION

This invention relates to an engine timing pickup probe of the magnetic type, and more particularly to a self-adjusting pickup probe adapted for mounting in a tubular engine mounting bracket, the bracket having an exterior annular recess spaced from its free end. The probe is adapted to respond to a position indicator on a rotating engine part by generating an electric signal each time the indicator moves by the end of the probe.

The signals generated by the probe are fed to associated equipment, usually a meter, and are utilized in performing engine tests such as initial engine timing, advance engine timing, engine RPM checks, vacuum advance and mechanical advance.

The quality of the signals produced by the pickup probe is dependent on the air gap between the sensor of the pickup probe and the rotating member. The air gap which produces high quality signals should not be changed significantly during the course of a testing procedure. However, the rotating engine parts with which the pickup probe cooperates are subject to dimensional irregularities due to tolerances, wear or both. Accordingly, the pickup probe of the invention is provided with a self-adjusting capability so as to accommodate these dimensional irregularities without loss of the air gap which provides quality signals.

One object of the invention, therefore, is to provide a self-adjusting pickup probe adapted for mounting within a tubular engine mounting bracket which has an exterial annular recess spaced from its free end.

Another object is to provide a pickup probe which is subject to manual adjustment for an initial position air gap that produces high quality signals.

Another object is to provide a self-adjusting pickup probe which during operation is subject to engagement and displacement by a rotating engine part, the probe returning toward initial position when the engagement lessens in degree or terminates, thereby maintaining the high quality signals.

Applicants are unaware of prior art believed to be pertinent to this development.

SUMMARY OF THE INVENTION

The self-adjusting engine timing pickup probe of the invention is adapted for mounting within a tubular engine mounting bracket which has an exterior annular recess spaced from its free end. The probe extends into close proximity with an indicator on a rotating engine part to provide an effective air gap between the probe and the rotating engine part.

The probe includes a tubular member receivable within the engine mounting bracket, the tubular member having an external seat adapted to engage the free end of the mounting bracket.

An elongated sensor assembly, including a sensor element, extends through the tubular member and has relative axial movement therewith so the sensor assembly may be adjusted manually to an initial effective air gap position.

Inteference means is provided between the tubular member and the sensor assembly for establishing substantial resistance to relative axial movement between the member and assembly.

A spring means secured to the tubular member extends into effective relationship with the engine mounting bracket, the spring means having at least one cam surface which engages the mounting bracket and enters the exterior recess therein, thereby being capable of urging the tubular member and the sensor assembly inwardly toward the rotating engine part. This spring means is sufficiently yieldable in relation to the interference means which provides substantial resistance so that the tubular member and sensor assembly may move outwardly of the mounting bracket, when the rotating engine part engages the sensor assembly, without causing relative axial movement between the sensor assembly and the tubular member. The engagement of the sensor assembly by the rotating engine part often occurs at higher speeds due to cumulative tolerances, wear, engine vibrations, and so forth.

When the engagement of the sensor assembly by the rotating engine part becomes of lesser degree or terminates, the spring means on the tubular member is effective to urge the tubular member and sensor assembly inwardly towards the rotating engine part, thereby tending to restore the air gap position initially established by manual adjustment.

In more detailed aspect, the interference means between the tubular member and the sensor assembly includes at least one spring member seated in a recess in the external surface of the sensor assembly, the spring member being slightly convex so as to engage the internal surface of the tubular member and establish substantial resistance to relative axial movement between the assembly and the member. In another form of the invention, the interference means includes a plurality of spring members each seated in a recess in the external surface of the sensor assembly, the spring members each engaging the internal surface of the tubular member.

The spring means on the tubular member may have the form of a central annular portion having a pair of opposed spring elements each having a cam surface which engages the engine mounting bracket and enters the annular recess therein.

BRIEF DESCRIPTION OF THE DRAWINGS

FIG. 1 is an elevational view of a self-adjusting engine timing pickup probe embodying the invention.

FIG. 2 is a perspective view of components of the pickup probe shown in exploded or separated manner.

FIG. 3 is a longitudinal sectional view of the pickup probe mounted in the engine mounting bracket, the sensor of the probe being shown in effective relation with a rotating engine part having a position indicator on the periphery.

FIG. 4 is a sectional view generally like FIG. 3, certain parts of the pickup probe being shown in alternate position so as to illustrate the self-adjusting characteristic of the probe which compensates for dimensional irregularities in engines with which the probe is used.

DESCRIPTION OF THE PREFERRED EMBODIMENT

Referring to FIGS. 1, 3 and 4 of the drawings, the illustrated self-adjusting engine timing pickup probe embodying the invention is generally designated 8.

Pickup probe 18 is adapted for mounting within a tubular engine mounting bracket 10, best shown in FIG. 2, the bracket 10 being an engine part carried on fixed arm 11 which also is an engine part. Mounting bracket 10 has an annular recess 12, best shown in FIG. 2, spaced from free end 13 of the bracket.

Pickup probe 8 includes a tubular member 15, best shown in FIG. 2, adapted to be received within the engine mounting bracket 10, as shown in FIGS. 3 and 4. Tubular member 15 has an external seat 16, again best shown in FIG. 2, the lower surface of seat 16 being adapted at times to engage the free end 13 of mounting bracket 10, as shown in FIG. 3. At other times, seat 16 will be spaced from the free end 13 of bracket 10, as shown in FIG. 4 at 17.

An elongated sensor assembly 20, including a central sensor 21, both best shown in FIG. 2, extends through tubular member 15, as shown in FIGS. 3 and 4. When pickup probe 8 is mounted for operation in engine mounting bracket 10, the free end of sensor assembly 20, including the free end of sensor 21, is disposed in proximity with a rotating engine part 24, the engine part 24 having a position indicator 25 on its periphery. As shown, position indicator 25 is in the form of a notch in the periphery of the rotating part 24.

Sensor assembly 20, as previously mentioned, extends through tubular member 15, the two being axially movable relative to each other. This relative axial movement, as will be seen, permits manual adjustment of probe 8 to a desired initial position which provides an effective air gap 26 between sensor 21 and the periphery of the rotating engine part 24. Air gap 26 is shown in FIG. 3, but the dimension thereof is exaggerated to permit illustration. In practice, an air gap which provides a reliable signal with a commercial magnetic sensor has a dimension falling in the range of 0.000 to 0.060 inches.

Interference means generally designated 28 in FIG. 2 is provided between tubular member 15 and sensor assembly 20 to establish substantial resistance against relative axial movement between member 15 and assembly 20. As shown, interference means 28 includes at least one spring member 29 seated in a recess 29a in the external surface of sensor assembly 20. Spring member 29, as shown, is slightly convex so as to engage with spring pressure the internal surface of tubular member 15, thereby establishing substantial resistance against relative axial movement. In one commercial form of the invention, interference means 28 includes a plurality of spring members 29, as shown in FIG. 2, each seated in recess 29a in the external surface of sensor assembly 20 and engaging the internal surface of tubular member 15.

The resistance against relative axial movement between tubular member 15 and sensor assembly 20 established by interference means 28, while substantial, nevertheless readily can be overcome manually in adjusting the pickup probe 8 to effective initial air gap position. This adjustment will be mentioned after completing the structural description of the probe 8.

Spring means generally designated 30 (FIGS. 1, 2, 3, and 4) secured to tubular member 15 extends into effective relation with tubular mounting bracket 10 and annular recess 12 therein. Spring means 30 has at least one cam surface 31 which engages mounting bracket 10 and enters the annular recess 12. In the form of the invention illustrated, spring means 30 includes a central annular portion 32 and a pair of opposing spring elements 33 and 34 (FIGS. 2, 3, and 4). Each spring element 33 and 34 has a cam surface which engages bracket 10 and enters the annular recess 12.

In the illustrated form of the invention, probe 8 includes a knob 40 secured to the upper portion of tubular member 15. As shown, knob 40 has threaded relation with tubular member 15, and central annular portion 32 of spring means 30 is clamped between knob 40 and the external seat 16 of tubular member 15. This clamped relationship is shown in FIGS. 3 and 4. Knob 40 is shown relieved at 41 (FIG. 2) to avoid interference with engine parts that may be present.

Completing the description of pickup probe 8, sensor assembly 20 is secured to a header 45 shown in full in FIG. 1. Electrical conductors (not shown) extend from sensor 21 through header 45, an elongated flexible sheath 46 connected to header 45, and flexible cable 47. Cable 47 terminates in a plug 48 for reception in a meter (not shown) or other indicating means calibrated to display the information for the tests being performed with pickup probe 8.

Having described the structure of probe 8, the use and operation of the probe in performing engine tests now will be described.

Probe 8, as previously mentioned, is adapted to be inserted in engine mounting bracket 10 which is located adjacent a rotating engine part 24 having a position indicator 25 on the periphery thereof. The location of mounting bracket 10 often is comparatively inaccessible due to interference from other engine parts, so it ordinarily is preferred to insert probe 8 in mounting bracket 10 while the engine is not in operation.

Probe 8 is inserted in bracket 10 as shown in FIG. 3, the external seat 16 of tubular member 15 resting on the free end 13 of bracket 10. The spring elements 33 and 34 of spring means 30 engage mounting bracket 10, and cam surfaces 31 thereof enter the annular recess 12 of the mounting bracket.

With probe 8 thus mounted in bracket 10 as shown in FIG. 3, the operator makes manual adjustment of probe assembly 20 so as to establish an initial effective air gap position of sensor 21. This is accomplished simply by pushing down on header 45 to move sensor assembly 20 and sensor 21 into engagement with rotating engine part 24. Following this engagement, the operator manually holds down knob 40 to maintain seat 16 in engagement with free end 13 of mounting bracket 10, and withdraws header 45 slightly so as to establish a small air gap 26 between sensor 21 and rotating member 24. Thereafter the engine is started, and allowed to idle at low speed.

Plug 48 of probe 8 is connected to the meter or other indicating device used in the test being performed, and visual note is made of the signal appearing on the meter or other device. If the signal is satisfactory, gap 26 has been set properly. If the signal is not satisfactory, further manual adjustment of the air gap is made.

Engine timing and other tests made with probe 8 are conducted at various engine speeds. Due to tolerances in manufacture, conditions of wear, engine vibration, etc., rotating engine parts 24 in various engines do not have the same rotational characteristics. Thus, at higher engine speeds, rotating engine parts 24 tend to come into engagement with sensor assembly 20, thereby altering the initial air gap setting. Sensor 21 usually generates useful signals even when air gap 26 is reduced substantially to zero, so engagement between rotating engine part 24 and sensor 21 does not result in loss of readings in most instances.

When the aforesaid engagement between rotating engine part 24 and sensor assembly 20 and sensor 21 occurs, spring means 30 yields and allows sensor assembly 20 to move outwardly. Since interference means 28 between sensor assembly 20 and tubular member 15 offers considerably more resistance to relative axial movement between the two than the resistance of spring means 30 with respect to bracket 10 relative axial movement between assembly and member does not occur. Rather, sensor assembly 20 and tubular member 15 move together when sensor assembly 20 is engaged by rotating engine part 24. During periods between the "highs" and "lows" of rotating engine part 24 in relation to sensor assembly 20, spring means 30 is effective to cause sensor assembly 20 and tubular member 15 to move inwardly, of "float", toward a setting which restores the initial effective air gap position. These features, of course, enable the testing to continue notwithstanding the "out" and "in" movements of probe assembly 20 due to "highs" and "lows" on rotating engine part 24. Further, probe 8 does not become disassociated with engine mounting bracket 10 due to engagement with rotating engine part 24.

From the above description it is thought that the construction and advantages of the invention will be readily apparent to those skilled in the art. Various changes in detail may be made without departing from the spirit or losing the advantages of the invention.

Having thus described the invention, what is claimed as new and desired to secure by Letters Patent is:

1. A self-adjusting engine timing pickup probe adapted for mounting within a tubular engine mounting bracket having an exterior annular recess spaced from its free end, said probe extending into proximity with an indicator on a rotating engine part to provide an air gap therebetween, comprising:
    a tubular member adapted to be received within the engine mounting bracket, said tubular member having an external seat adapted to engage the free end of the mounting bracket;
    an elongated sensor assembly extending through said tubular member and having relative axial movement therewith for manual adjustment to an initial air gap position which provides quality signals;
    interference means between said tubular member and said sensor assembly establishing substantial resistance to relative axial movement; and
    spring means secured to said tubular member and extending into effective relation with the engine mounting bracket, said spring means having at least one cam surface which engages the engine mounting bracket and enters the annular recess, thereby urging said tubular member and said sensor assembly inwardly toward the rotating engine part, said spring means being sufficiently yieldable to permit said tubular member and sensor assembly to move outwardly without relative axial movement therebetween when said sensor assembly is engaged by the rotating engine part,
    whereby said at least one cam surface cooperates with the mounting bracket to urge said tubular member and sensor assembly inwardly toward initial air gap position when so permitted by the rotating engine part, the probe thereby continuing to provide quality signals.

2. The self-adjusting engine timing pickup probe of claim 1, wherein said interference means includes at least one spring member seated in a recess in the external surface of said sensor assembly, said spring member engaging the internal surface of said tubular member.

3. The self-adjusting engine timing pickup probe of claim 1 wherein said interference means includes a plurality of spring members each seated in a recess in the external surface of said sensor assembly, said spring members engaging the internal surface of said tubular member.

4. The self-adjusting engine timing pickup probe of claim 1 wherein said spring means includes a pair of opposed spring elements each having a cam surface which engages the mounting bracket and enters the annular recess thereof.

5. The self-adjusting engine timing pickup probe of claim 1 with the addition of a knob secured to the upper portion of said tubular member and wherein said spring means includes an annular portion clamped between said external seat of said tubular member and said knob.

6. The self-adjusting engine timing pickup probe of claim 1 with the addition of a knob secured to the upper portion of said tubular member, said knob having a flange for manual manipulation, said flange having a flat for clearance of engine components.

* * * * *